United States Patent [19]
Kawakubo et al.

[11] Patent Number: 5,976,289
[45] Date of Patent: Nov. 2, 1999

[54] METHOD OF FABRICATING INSTRUMENT PANEL

[75] Inventors: Yasushi Kawakubo; Shiro Ozaki, both of Osaka, Japan

[73] Assignee: Toyo Tire & Rubber Co., Ltd., Osaka, Japan

[21] Appl. No.: 08/976,898

[22] Filed: Nov. 24, 1997

[30]     Foreign Application Priority Data

Dec. 13, 1996  [JP]  Japan ................................. 8-334103

[51] Int. Cl.⁶ .............................. B32B 5/20; B32B 31/06; B62D 25/14
[52] U.S. Cl. ..................... 156/78; 264/46.5; 264/261; 264/263; 264/328.9; 29/450; 296/70
[58] Field of Search .............................. 156/78; 264/46.5, 264/261, 263, 276, 328.1, 328.9; 296/70, 146.7; 29/408, 453, 450

[56]            References Cited

U.S. PATENT DOCUMENTS

| 3,798,869 | 3/1974 | Nipp ...................................... 29/453 X |
| 3,868,802 | 3/1975 | Schubach .............................. 29/453 X |
| 4,386,982 | 6/1983 | Weinhaus ........................... 264/46.5 X |
| 5,500,169 | 3/1996 | Kondo et al. .......................... 264/46.5 |
| 5,618,477 | 4/1997 | Suzuki ................................... 264/46.5 |
| 5,736,082 | 4/1998 | Funato et al. .......................... 264/46.5 |

FOREIGN PATENT DOCUMENTS

| 7-314469 | 12/1995 | Japan . |
| 7-329077 | 12/1995 | Japan . |
| 7-329080 | 12/1995 | Japan . |
| 8-127033 | 5/1996 | Japan . |
| 8-132920 | 5/1996 | Japan . |
| 8-197648 | 8/1996 | Japan . |

Primary Examiner—Michael W. Ball
Assistant Examiner—Shawn A. Mitchell
Attorney, Agent, or Firm—Jordan & Hamburg LLP

[57]            ABSTRACT

A method of fabricating an instrument panel includes providing a skin which forms a surface of the instrument panel and has side face portions extending rearwardly from a front face portion and providing a panel core having a recess for defining a molding space between the panel core and the skin. The front face portion and the side face portions define a bend angle. The recess of the panel core has peripheral walls for engaging the side face portions and the peripheral walls and a surface of the recess define a regular angle which is less than the bend angle. The bend angle, for instance, is larger than the regular angle by 2° to 8°, and preferably by 3° to 5°. The panel core is placed in a first die and the skin is place in a second die such that the side face portions are deflected to fit into the recess of the panel core during mold closing. The dies are closed and a foaming material is injected between the panel core and the skin to integrate the panel core and the skin. The side face portions resiliently engage the peripheral walls to prevent leakage of the foaming material. In an embodiment of the method, a skin holding member is movably provided in the second die for holding the side face portions in position during mold closing. The skin holding member is withdrawn to permit engagement of the side face portions with the peripheral walls after mold closing.

11 Claims, 9 Drawing Sheets

METHOD OF FABRICATING INSTRUMENT PANEL

BACKGROUND OF THE INVENTION

The present invention relates to a method of fabricating an instrument panel, particularly to a method of fabricating an instrument panel where previously and separately formed panel core material and skin are arranged and held in a pair of dies of a mold and a foaming material of polyurethane or the like, injected between the panel core material and the skin, is foamed whereby the panel core material, the skin and a foamed layer are integrated.

Conventionally, a skin of this kind of instrument panel is formed using a thin flexible material of a plastic sheet or the like. Therefore, when an end edge portion of the skin is simply bent to the rear side a side face portion thereof is formed projecting, the projected side face portion is deficient of self standing performance and falls toward the inside by its own weight. When such a skin having the projected side face portion is used, if the skin is arranged inside of a die of a mold, falling of the projected side face portion produces a gap between the projected side face portion and a peripheral wall of a recess of the panel core material arranged and held in the other die and the sealing performance therebetween is much deteriorated. Therefore, the foaming material leaks or wrinkles or the like is caused at the end edge portion of the skin whereby the product yield is reduced due to deterioration of appearance or the like.

As a measure for preventing leakage of foaming material or deterioration of outlook caused by falling such a projected side face portion, conventionally, as disclosed in JP-A-07314469, a recess groove is formed by folding back outwardly a projected front end of a side face portion formed by bending an end edge of a skin rearwardly, and a member for holding the edge portion of the skin projected from one die is fitted to the recess groove. Thus, the skin is positioned by holding the projected side face portion of the skin and preventing the projected side face portion from falling inwardly (hereinafter, referred to as prior art).

However, according to the prior art, the front end of the side face portion projected by bending the end edge portion of the skin rearwardly, must be folded back outwardly to form the recess groove and accordingly, the shape of the skin per se is complicated and an increase in molding cost is inevitable.

Further, it is very difficult to set a timing for drawing out the member, holding the edge portion of the skin fitted to the recess groove at the front end of the projected side face portion, from the recess groove, and pulling and incorporating the member into one die of the mold. That is, basically, when the member for holding the edge portion of the skin is pulled and withdrawn into one die in the midst of foaming a foaming material injected between the recess portion of the panel core material and the skin, thereafter, the projected side face portion is pressed toward the inner face side of the peripheral wall portion of the recess of the panel core material by a foaming pressure and accordingly, the projected side face portion can be prevented from falling inwardly. However, a timing of generating the foaming pressure sufficient for preventing the projected side face portion from falling is dispersed depending on kind of foaming material, magnitude of a cavity or the like. Therefore, the member for holding the edge portion of the skin may be pulled and withdrawn into the die before generating the foaming pressure sufficient for preventing the projected side face portion from falling. As a result, a portion of the projected side face portion may fall inwardly by which the sealing performance may be deteriorated. Or, the member for holding the edge portion of the skin may be forcibly pulled and withdrawn into the die at a stage where the foaming pressure is intensified excessively. As a result, during the pulling operation, the projected side face portion, particularly, its base end portion may be impaired or wrinkled or the like by which the appearance may be deteriorated.

Further, in the above-described prior art, the recess groove is formed by folding back outwardly the front edge of the side face portion. Therefore, the side face portion of the skin is provided with inner and outer double folding structure and a slight gap may be caused at a boundary between the inner face of the peripheral wall portion of the recess of the panel core material and the side face portion of the skin. After finishing, dust and dirt or the like may enter between the gap during use which is not preferable for appearances.

SUMMARY OF THE INVENTION

The present invention has been carried out in view of the above-described situation and it is an object of the present invention to provide a method of fabricating an instrument panel capable of not only achieving a reduction in molding cost by simplifying a skin shape, but firmly preventing projected side face portions of the skin from falling inwardly and defect or wrinkles from occurring thus fabricating an instrument panel having excellent appearance, high yield and no gaps at boundaries between a panel core material and a skin.

According to an aspect of the present invention, there is provided a method of fabricating an instrument panel including the steps of arranging a panel core material having recesses for fitting to a skin in one die of a mold, arranging the skin previously formed with side face portions projected by being bent rearwardly at end edge portions of the skin in other die of the mold such that the projected side face portions are fitted to the recesses of the panel core material, injecting and foaming a foaming material between the recesses of the panel core material and the skin to thereby integrate the panel core material, the skin and a foaming layer, wherein a bend angle of each of the projected side face portion of the skin in respect of a surface portion of the skin is set to be slightly larger than a regular angle.

According to the fabrication method of the present invention, the side face portions formed to project by being bent rearwardly at the end edge portions of the skin, are bent outwardly such that the bent angle becomes slightly larger than the regular angle. Therefore, by fitting the projected side face portions of the skin to the recesses of the panel core material while bending them inwardly such that the bend angle becomes the regular angle by which the projected side face portions can elastically be brought into close contact with inner faces of the peripheral wall portions of the recesses of the panel core material. Then, the skin and the panel core material are set in a state where the side face portions are prevented from falling inwardly. Further, after the setting operation, the projected side face portions are pressed toward the sides of the inner faces of the peripheral portions of the recesses of the panel core material by a foaming pressure of the foaming material injected between the panel core material and the skin by which the projected side face portions are prevented from falling inwardly in the foaming operation.

Further, it is sufficient to only form the projected side face portions bent rearwardly at the end edge portions of the skin.

Therefore, compared with the above-described prior art where the recess groove is formed by further folding back outwardly the front end of the projected side face portion, a reduction in the molding cost is achieved by simplifying the shape of the skin per se. Also, the projected side face portions is firmly prevented from falling inwardly without using special members for holding edge portions of the skin. Accordingly, an instrument panel having excellent appearance is fabricated with high yield without leaking the foaming material and without defect or wrinkle at the end edge portions or the projected side face portions of the skin derived from deterioration in the sealing performance caused by falling of the projected side face portions. Further, only a single layer of the projected side face portion is brought into close contact with the inner face of the peripheral wall portion of the recess of the panel core material and no gap is caused at boundaries therebetween. Therefore, there is no problem of deterioration in the appearance during using the instrument panel such as invasion of dust, dirt or the like into the gap so excellent appearance is maintained over a long period.

According to the method of fabricating an instrument panel of the present invention, it is preferable that the bend angle of the projected side face portion of the skin is set to be larger than the regular angle by 2° through 8°. When the bend angle is larger than the regular angle by less than 2°, the elastic force for bringing the projected side face portion into close contact with the inner face of the peripheral wall portion of the recess of the panel core material is deficient and the sealing performance to prevent the foaming material from leaking out is not sufficient. Further, when the bend angle is larger than the regular angle by more than 8°, the projected side face portion is difficult to fit to the recess portion of the panel core material, that is, the mold closing operation is difficult to perform. Accordingly, it is most preferable to set the bend angle to be larger than the regular angle by a range of 3° through 5° in view of the sealing performance and the easiness of the mold closing operation.

According to the method of fabricating an instrument panel of the present invention, the projected side face portion is formed in a stepped shape having a base end portion that is brought into contact with the inner face of the peripheral wall portion of the recess and a front end portion which deforms inwardly when the projected side face portion of the skin is fitted to the recess of the panel core material.

In this case, not only the rigidity of the projected side face portion of the skin is promoted and the side face portion is further firmly prevented from falling inwardly, but the mold closing operation is facilitated while promoting the sealing performance in accordance with the elastic force for bringing the side face portion into close contact with the inner face of the peripheral wall portion of the recess of the panel core material.

Further, according to the method of fabricating an instrument panel of the present invention, when the skin is arranged in the other die of the mold, the skin may be arranged in the other die using holding the skin by a skin holding member having a face holding member extending along an outer face of the projected side face portion of the skin and the skin holding member may be pulled and withdrawn into the other die at a stage prior to injection of the foaming material.

In this case, a projected side face portion of the skin having the bend angle larger than the regular angle is bent inwardly and held by the skin holding member such that the bend angle is changed to the regular angle by which the mold closing and the positioning of the projected side face portion with respect to the recess of the panel core material can be performed very easily. Moreover, the skin holding member does not perform a function of preventing the projected side face portion from falling inwardly. Therefore, the skin holding member may be pulled and withdrawn into the die at a stage prior to injecting the foaming material. Accordingly, the use of the skin holding member does not deteriorate the sealing performance or produce defect or wrinkle at the projected side face portion.

Further, according to the method of fabricating an instrument panel of the present invention, the projected side face portion of the skin and the peripheral portion of the recess of the panel core material corresponding thereto, may be formed with fitting portions for positioning both by being fitted to each other in accordance with the mold closing operation of dies.

In this case, a contact area for the projected side face portion and the inner face of the peripheral wall portion of the recess in a state where the skin and the panel core material are set in a predetermined manner, is increased and the sealing performance for preventing the foaming material from leaking out is promoted by forming the contact portion in a bent shape.

DETAILED DESCRIPTION OF THE PREFERRED EMBODIMENTS

An explanation is given below of embodiments of the present invention in reference to the drawings as follows.

Figure 1:
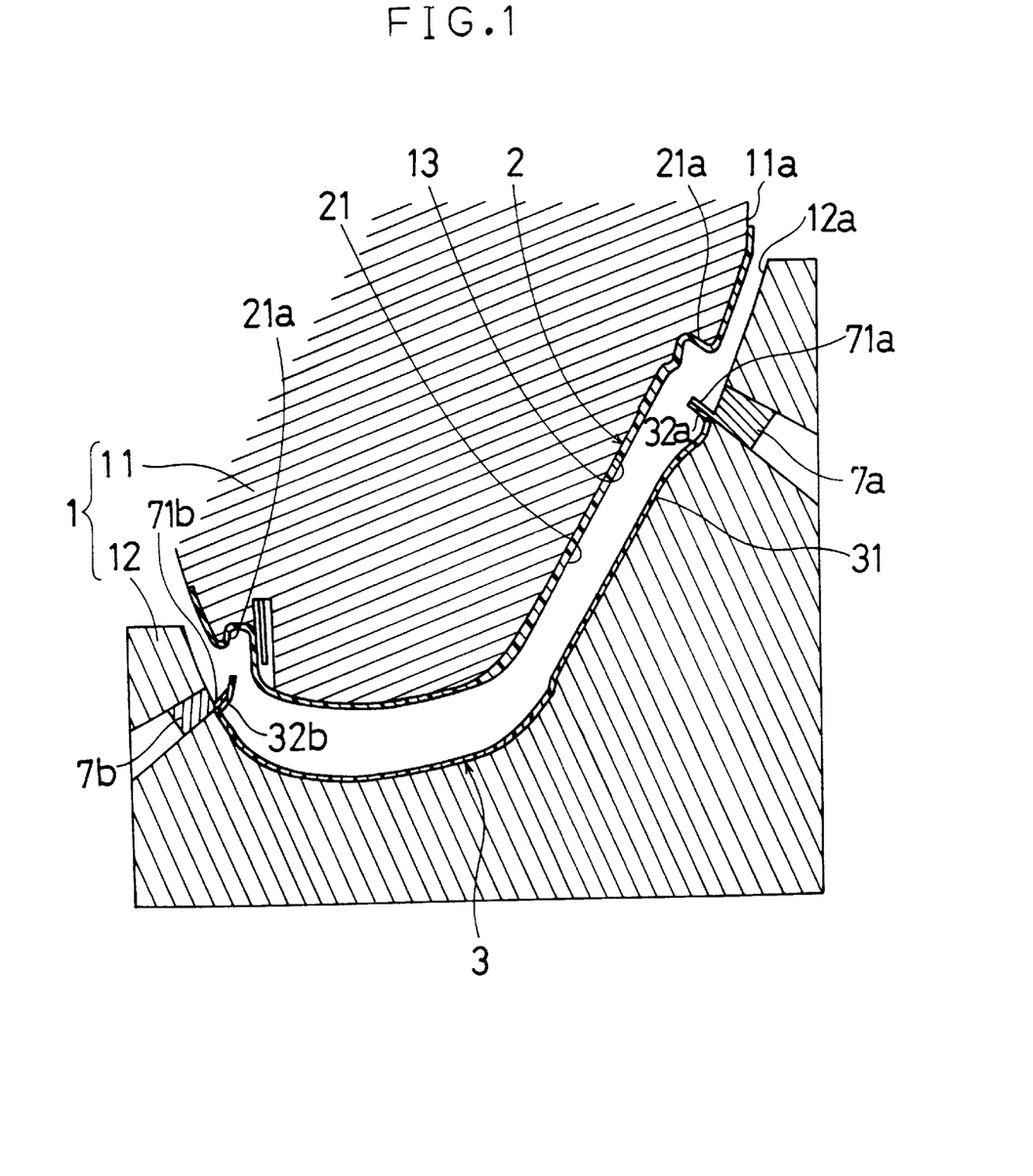
FIG. 1 is a sectional view showing a state before closing a mold where a skin and a panel core material are arranged in the mold according to a method of fabricating an instrument panel in respect of an embodiment of the present invention.
Figure 9:
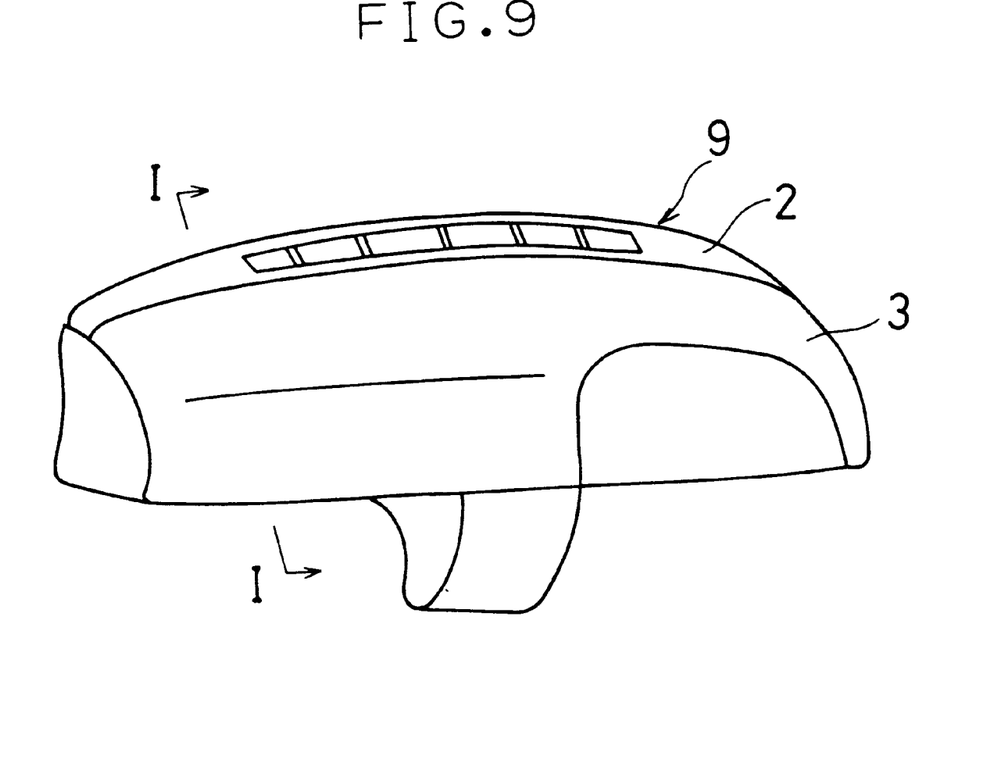
FIG. 9 is a perspective view of an instrument panel of an automobile.

FIG. 1 is a sectional view showing a state before closing a mold where a panel core material 2 and a skin 3 are arranged in a mold 1 used in a method of fabricating an instrument panel according to an embodiment of the present invention. Here, a section corresponding to a section I—I of instrument panel 9 in FIG. 9, is shown.

As shown by FIG. 1, the mold 1 comprises divided molds of an upper die 11 and a lower die 12. The upper die 11 is provided with a die face 11a for accepting the panel core material 2. A recess 21 in the core material 2 complements the skin 3. The die face 11a is formed with a recess 13 for arranging the recess 21 of the panel core material 2 in a fitted state. Further, the lower die 12 is provided with a die face 12a for arranging the skin 3. Portions of the lower die 12 where end edge portions of the skin 3 are arranged, are provided with skin holding members 7a and 7b such that the skin holding members 7a and 7b can freely be projected from and withdrawn into in the die face 12a.

The panel core material 2 is molded by thermoplastic plastics of AS (acrylonitrile styrene), PP (polypropylene), denatured PPO (denatured polyphenylene oxide) and the like or plastics having excellent shape holding performance such as fibre reinforced plastics and the like made from AS and the like. The recess 21 is formed at a central portion thereof. The panel core material 2 having such a shape is arranged inside of the upper die 11 such that the recess 21 is fitted to the recess 13 of the die face 11a.

Meanwhile, the skin 3 comprises thermoplastic elastomers of polyvinyl chloride, polyolefin or polyurethane or the like and is molded into a predetermined shape by powder slash molding, vacuum molding or the like separately from the panel core material 2. The skin 3 is provided with a surface portion 31 constituting the surface of the instrument panel. Side face portions 32a and 32b, are formed to project to fit the recess 21 of the panel core material 2 by bending rearwardly both end edge portions thereof.

Figure 2A:
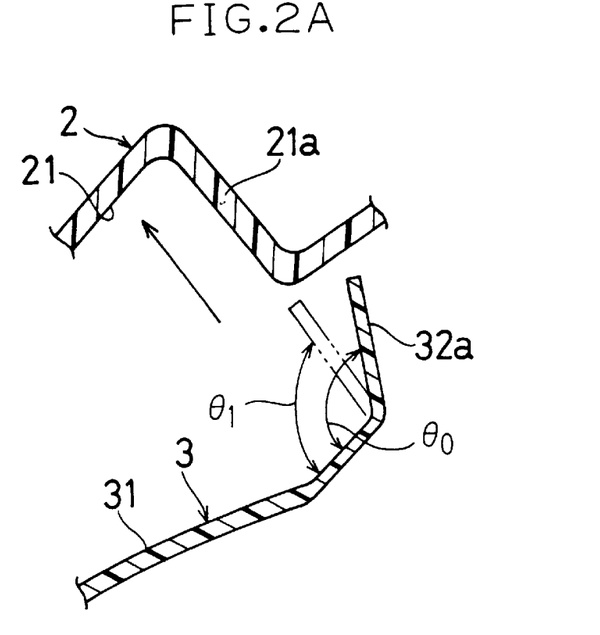
FIG. 2A and FIG. 2B are respectively sectional views enlarging essential portions in FIG. 1.
Figure 2B:
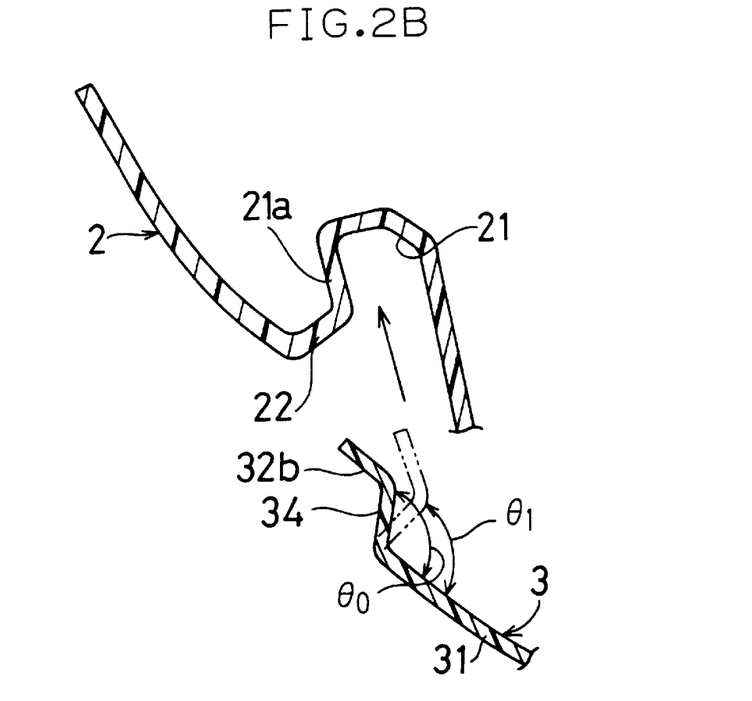

According to each of the projected side face portions 32a and 32b, as illustrated by FIG. 2A and FIG. 2B, a bend angle $\theta_0$ with respect to the surface portion 31 of the skin 3 is previously set to be larger than a regular angle $\theta_1$ by a range of 2° through 8°, preferably 3° through 5°. Here, the regular angle $\theta_1$ is referred to as an angle of the projected side face portion 32a or 32b with respect to the surface portion 31 when the projected side face portions 32a and 32b of the skin 3 are fitted to the recess 21 of the panel core material 2.

Further, as shown by FIG. 2B, one side of the projected side face portion 32b and a peripheral wall portion 21a of the recess 21 of the panel core material 2 corresponding thereto are formed with fitting portions 34 and 22 for relatively positioning the skin 3 and the panel core material 2 by fitting to each other in with the mold closing operation closing the both dies 11 and 12 of the mold 1. The fitting portions 34 and 22 are fitted to each other in a direction inclined to the mold closing direction, or a direction substantially orthogonal thereto in this case. The positioning of the skin 3 and the panel core material 2 in a mold closing direction is performed by the fitting operation. The peripheral wall portion 21a of the recess 21 is disposed in a direction substantially parallel to the mold closing direction and has a bent shape that is bent outwardly at a mid-portion. The inclined face portion bent outwardly constitutes the fitting portion 22 on the side of the panel core material 2. The projected side face portion 32b is provided with a bent shape corresponding to the bent shape of the peripheral wall portion 21a. The inclined face portion in contact with the fitting portion 22 on the side of the panel core material 2 constitutes the fitting portion 34 on the side of the skin 3.

The skin 3 having the above-described shape is arranged inside of the lower die 12 such that the surface portion 31 is brought into contact with the mold face 12a.

Further, the skin holding members 7a and 7b are provided with face holding members 71a and 71b in a thin plate shape, extending along outer faces of the projected side face portions 32a and 32b of the skin 3. The thicknesses of the face holding members 71a and 71b normally fall in a range of about 1 through 3 mm and projected lengths thereof normally fall in a range of about 5 through 15 mm although the lengths differ depending on the projected lengths of the projected side face portions 32a and 32b.

In fabricating the instrument panel, firstly, the panel core material 2 is arranged on the upper die 11 of the mold 1 and the skin 3 is arranged on the lower die 12. In that case, the face holding members 71a and 71b are projected from the die face 12a of the lower die 12 and the projected face holding members 71a and 71b are brought into contact with the outer faces of the projected side face portions 32a and 32b. Thereby, the projected side face portions 32a and 32b of the skin 3 are held by the skin holding members 7a and 7b in a state where the projected side face portions 32a and 32b are bend inwardly such that the bent angle $\theta_0$ becomes the regular angle $\theta_1$.

Figure 3:
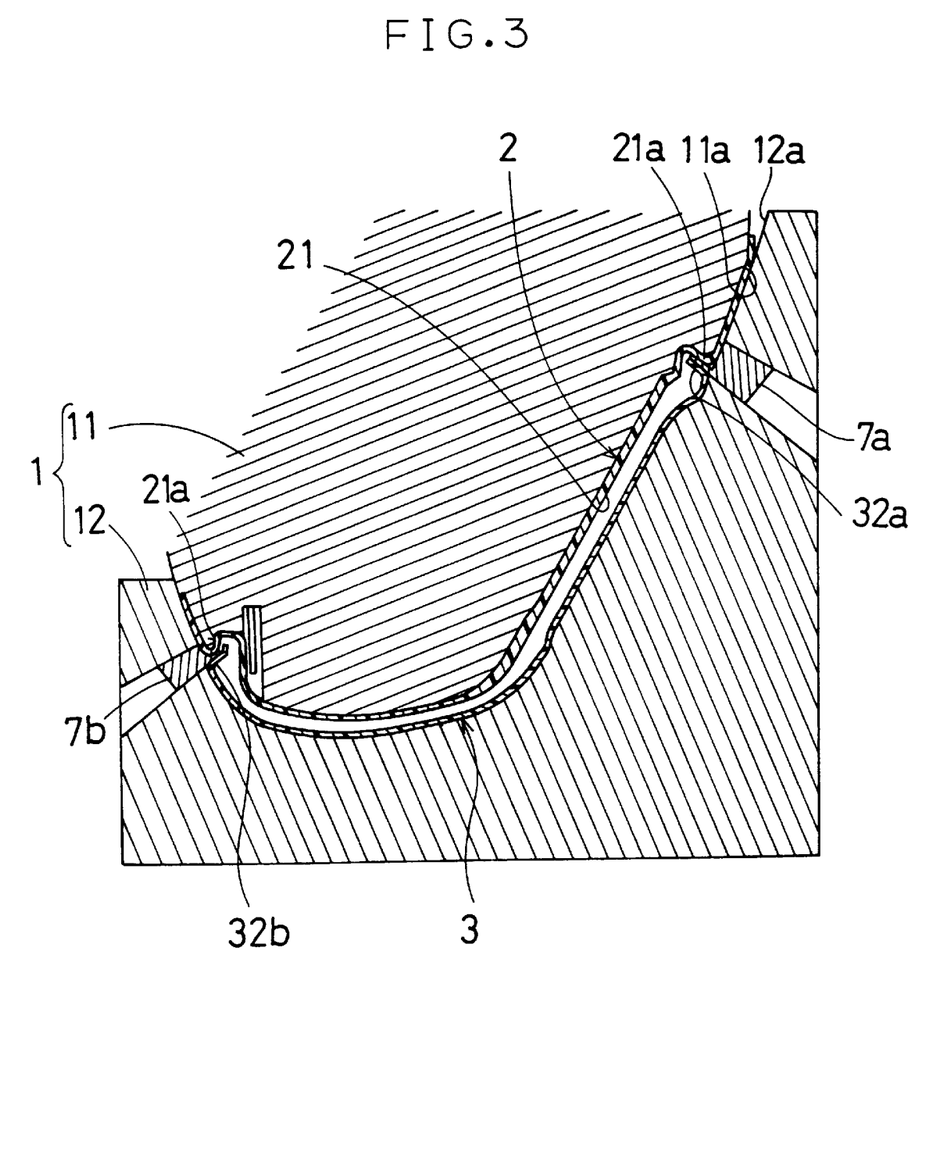
FIG. 3 is a sectional view showing a state where dies of the mold are closed in the above-described embodiment.

Under this state, as shown by FIG. 3, the both dies 11 and 12 of the mold 1 are closed and the projected side face portions 32a and 32b of the skin 3 are fitted to the recess 21 of the panel core material 2. Thereby, the projected side face portions 32a and 32b are elastically brought into close contact with inner faces of the peripheral wall portions 21a of the recess 21 of the panel core material 2 thereby preventing the projected side face portions 32a and 32b from further falling inwardly. The skin 3 and the panel core material 2 are set in a state where the skin 3 and the panel core material 2 are positioned in the mold, by fitting the fitting portions 34 and 22 to each other in a direction substantially orthogonal to the mold closing direction of the dies 11 and 12.

Figure 4:
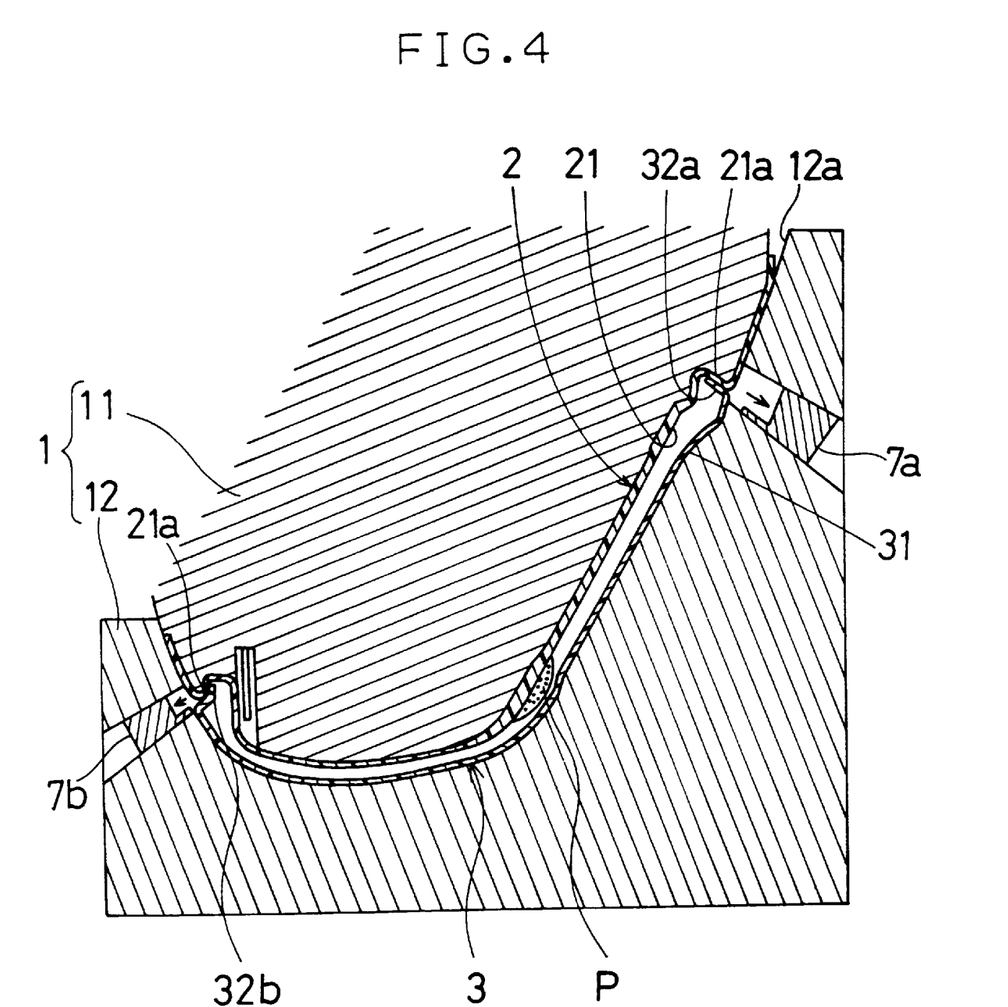
FIG. 4 is a sectional view showing a state where a foaming material is injected and foamed in the above-described embodiment.
Figure 5:
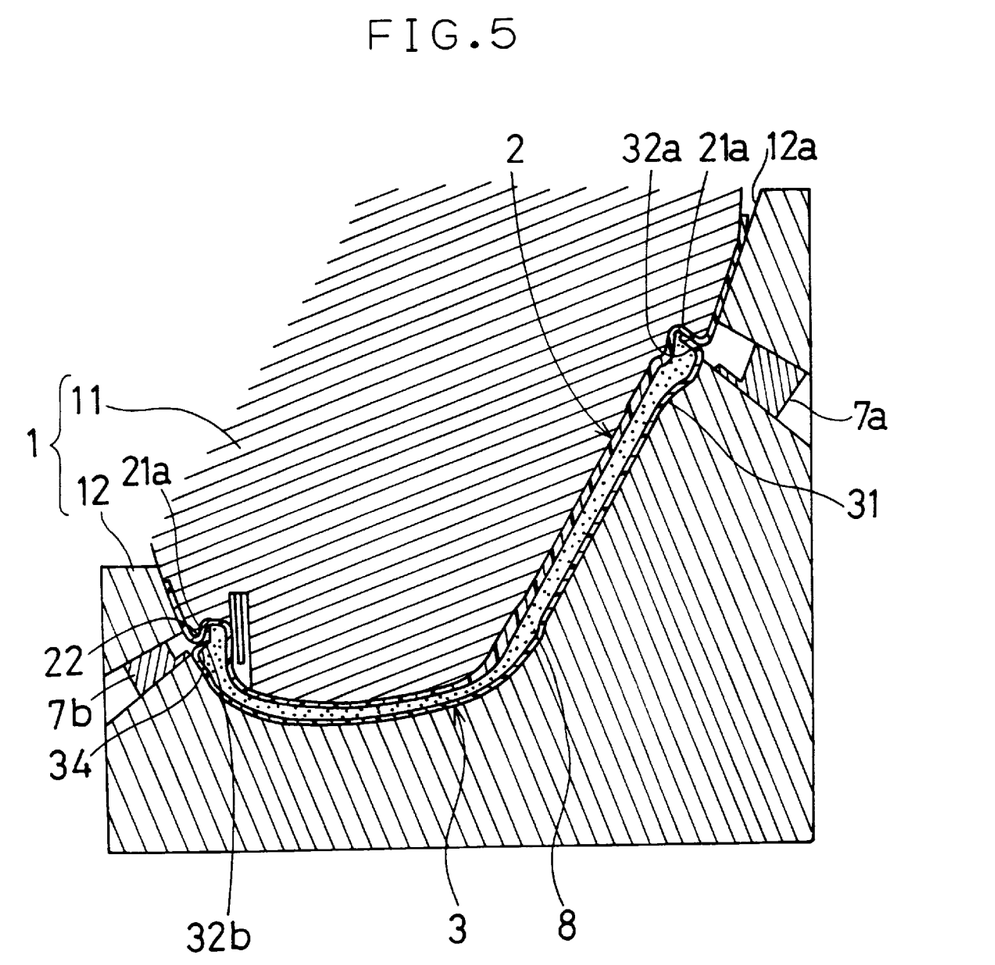
FIG. 5 is a sectional view showing a state where foaming is finished in the above-described embodiment.

Next, the skin holding members 7a and 7b are pulled and withdrawn into the lower mold 12 and thereafter, as shown by FIG. 4, a foaming material P of polyurethane or the like is injected and foamed between the panel core material 2 and the skin 3. At this moment, the projected side face portions 32a and 32b of the skin 3 are pressed toward the side of the peripheral wall portions 21a of the recess 21 of the panel core material 2 by the foaming pressure of the foaming material P and as shown by FIG. 5, the projected side face portions 32a and 32b are prevented from falling inwardly by being brought into close contact with the inner faces of the peripheral wall portions 21a. And on the side of the projected side face portion 32b, a close contact portion having a large area in a bent state is formed by fitting the fitting portions 34 and 22 to each other. Accordingly, the foaming material P is foamed in a state where leakage of the foaming material P from end edge portions of the skin 3 is prevented. The skin 3, the panel core material 2 and a foaming layer 8 are integrated by the close contact performance in the foaming operation. By removing the dies by opening the mold 1, the instrument panel 9 having a sectional structure shown by FIG. 6 is fabricated.

Figure 6:
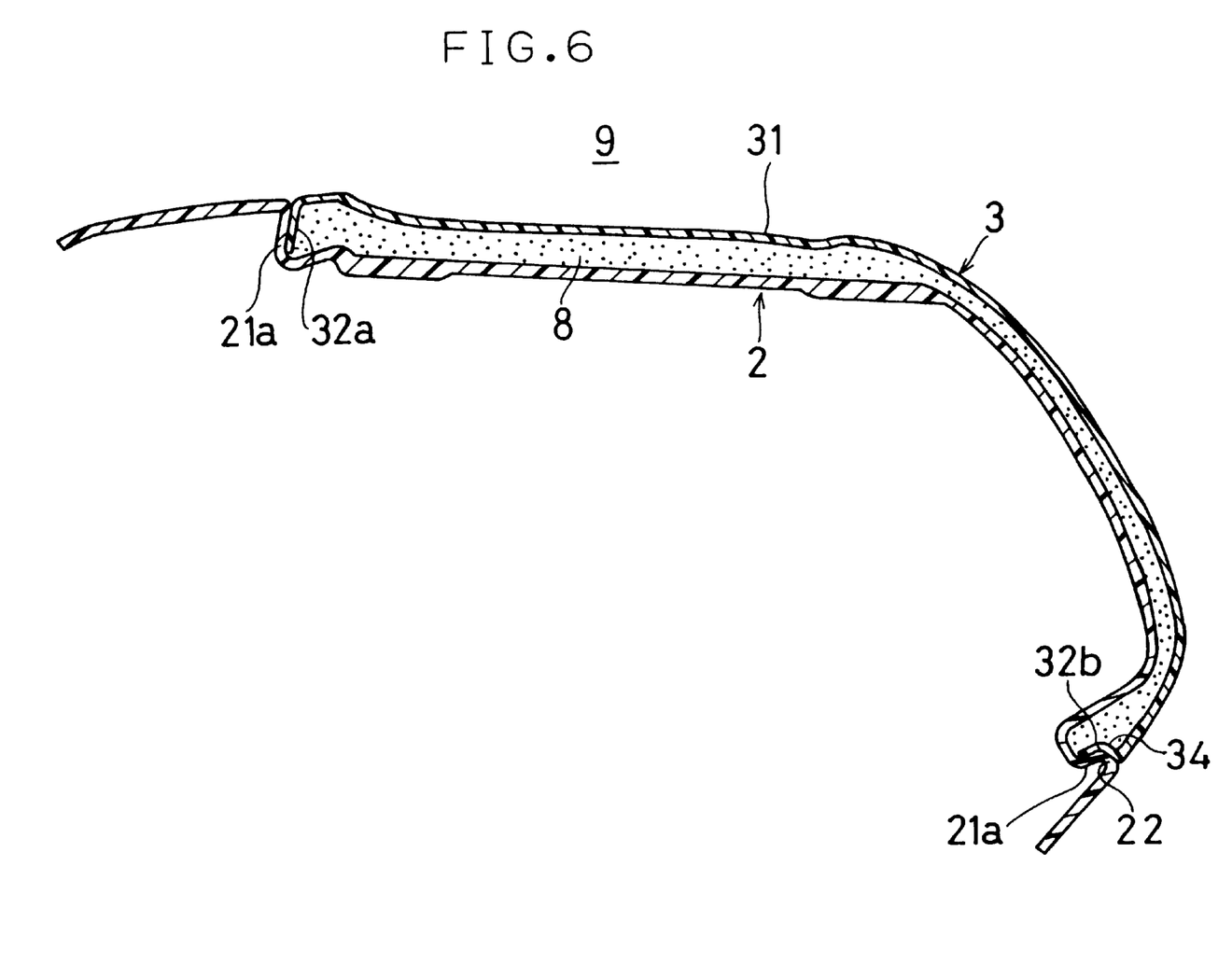
FIG. 6 is a sectional view of an instrument panel fabricated by the fabrication method of the above-described embodiment.

As apparent also from FIG. 6, according to the instrument panel 9 fabricated as described above, the projected side face portions 32a and 32b of the skin 3 comprise single layers and the single layers of the projected side face portions 32a and 32b are brought into close contact with the inner faces of the peripheral wall portions 21a of the recess 21 of the panel core material 2 and no gap exists at boundaries therebetween. Accordingly, in using the instrument panel 9, the appearance is prevented from deteriorating by invasion and storage of dust, dirt or the like in the gaps.

Incidentally, although according to the above-described embodiment an explanation has been given of the closed injection system for injecting the foaming material P in a state where the mold 1 is closed, an open injection system for injecting the foaming material before closing the mold may be adopted.

Figure 7:
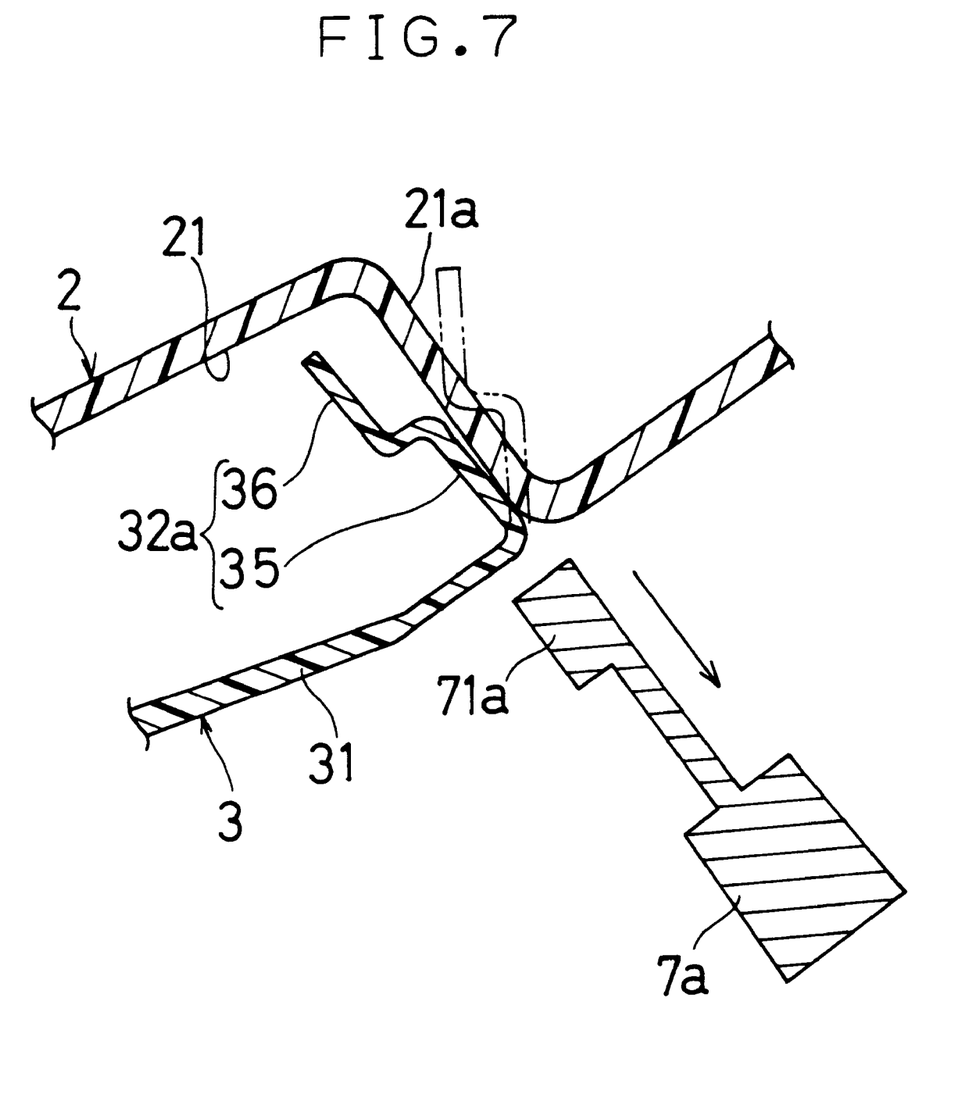
FIG. 7 is a sectional view enlarging essential portions and showing a method of fabricating an instrument panel according to other embodiment of the present invention.
Figures 8A, 8B:
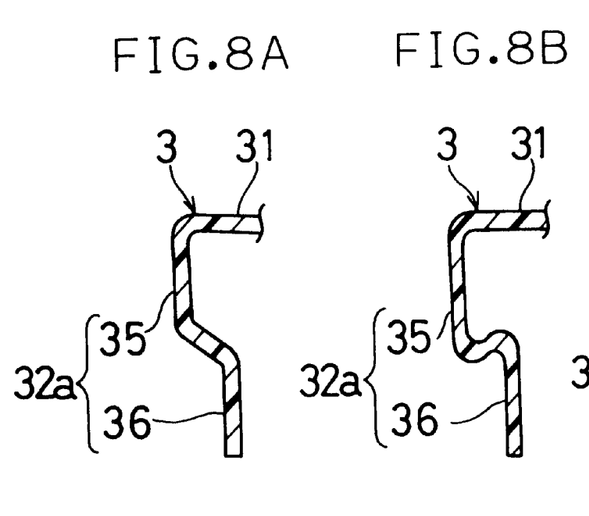
FIG. 8A through FIG. 8E are longitudinal sectional views enlarging essential portions and showing modified examples of projected side face portions of a skin according to the other embodiment shown by FIG. 7, respectively.
Figures 8C, 8D:
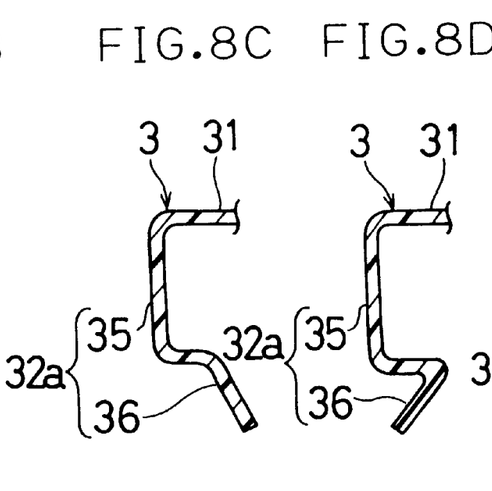
Figure 8E:
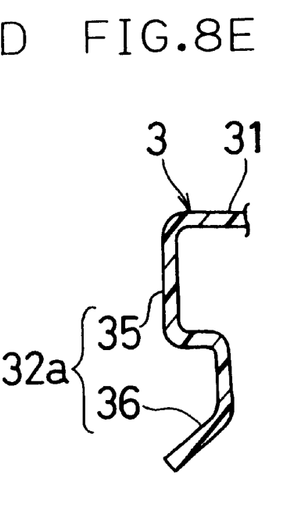

FIG. 7 is a sectional view enlarging essential portions and showing another embodiment of a method of fabricating an instrument panel according to the present invention.

According to the other embodiment, not only the bend angle $\theta_0$ of the projected side face portion 32a of the skin 3 is previously set to be larger than the regular angle $\theta_1$ by a range of 2° through 8°, preferably 3° through 5° as shown by imaginary lines of FIG. 7, but in fitting the projected side face portion 32a to the recess 21 of the panel core material 2 by bending the projected side face portion 32a inwardly to constitute the regular angle $\theta_1$ by using the skin holding member 7a, the projected side face portion 32a is formed in a stepped shape having a base end portion 35 in contact with the inner face of the peripheral wall portion 21a of the recess 21 and a front end portion 36 deformed inwardly with respect to the recess 21.

By forming the projected side face portion 32a in such a stepped shape, the rigidity of the projected side face portion 32a of the skin 3 is enhanced and the projected side face portion 32a is firmly prevented from falling inwardly. Also, the mold closing operation of the mold 1 is facilitated while promoting the sealing performance due to an elastic force caused by bringing the projected side face portion 32a in close contact with the inner face of the peripheral wall portion 21a of the recess 21 of the panel core material 2.

Incidentally, although the holding face 71a of the skin holding member 7a used in the other embodiment, is provided with a stepped undercut shape in compliance with the stepped shape of the projected side face portion 32a, since the skin holding member 7a is pulled and withdrawn to into lower die 12 before injecting the foaming material, no problem is posed in the pulling and withdrawing operation.

The stepped shape of the projected side face portion 32a of the skin 3 may be modified to any of shapes illustrated by FIG. 8A through FIG. 8E.

What is claimed is:

1. A method of fabricating an instrument panel comprising the steps of:

providing a skin formed with a front face portion to serve as a face surface of the instrument panel and side face portions extending rearwardly from the front face portion at end edge portions thereof and defining a bend angle subtended by the side face portions and a rear surface of the front face portion;

providing a panel core having a recess for complementing a contour of the skin to define a molding space between the panel core and the skin, the recess having peripheral walls for engaging the side face portions of the skin when the skin and the panel core are engaged together, the peripheral walls and said rear surface of said skin subtending a regular angle when the side face portions of the skin are fitted into engagement with the peripheral walls of the panel core, and the regular angle being less than the bend angle;

situating the panel core in a first die of a mold;

situating the skin in a second die of the mold such that the side face portions are fittable into the recess of the panel core during mold closing;

closing the mold and engaging the side face portions with the peripheral walls to define the molding space between the panel core and the skin; and injecting a foaming material into the molding space between the panel core and the skin to thereby integrate the panel core and the skin with a foaming layer formed by the foaming material.

2. The method of fabricating an instrument panel according to claim 1, wherein the bend angle of each of the side face portions of the skin is set to be larger than the regular angle by an amount in a range of 2° through 8°.

3. The method of fabricating an instrument panel according to claim 1, wherein the bend angle of each of the side face portions of the skin is set to be larger than the regular angle by an amount in a range of 3° through 5°.

4. The method of fabricating an instrument panel according to claim 1, wherein at least one of the side face portions of the skin is formed in a stepped shape having a base end portion in contact with the peripheral walls of the recess and a front end portion displaced inwardly into the recess when the side face portion is fitted to the recess of the panel core by closing the mold.

5. A method of fabricating an instrument panel comprising the steps of:

providing a skin formed with a front face portion to serve as a face surface of the instrument panel and side face portions extending rearwardly from the front face portion at end edge portions thereof and defining a bend angle subtended by the side face portions and a rear surface of the front face portion;

providing a panel core having a recess for complementing a contour of the skin to define a molding space between the panel core and the skin, the recess having peripheral walls for engaging the side face portions of the skin when the skin and the panel core are engaged together, the peripheral walls and said rear surface of said skin subtending a regular angle when the side face portions of the skin are fitted into engagement with the peripheral walls of the panel core, and the regular angle being less than the bend angle;

situating the panel core in a first die of a mold;

situating the skin in a second die by holding the skin in place in the second die using a skin holding member movably disposed in the second die and having a face holding member extending along and engaging an outer face of the side face portions of the skin such that the side face portions are fittable into the recess of the panel core during mold closing;

closing the mold;

pulling the skin holding member into the second die, prior to injecting foaming material and after the step of closing the mold, to engage the side face portions with the peripheral walls to define the molding space between the panel core and the skin; and injecting a foaming material into the molding space between the panel core and the skin to thereby integrate the panel core and the skin with a foaming layer formed by the foaming material.

6. The method of fabricating an instrument panel according to claim 1, wherein the side face portions of the skin and the peripheral walls of the recess of the panel core are each formed with fitting portions for engaging one another to position the side face portions and the peripheral walls relative to each other by the step of closing the mold.

7. A method of fabricating an instrument panel comprising the steps of:

providing a skin formed with a front face portion to serve as a face surface of the instrument panel and side face portions extending rearwardly from the front face portion at end edge portions thereof and defining a bend angle subtended by the side face portions and a rear surface of the front face portion;

providing a panel core having a recess for complementing a contour of the skin to define a molding space between the panel core and the skin, the recess having peripheral walls for engaging the side face portions of the skin when the skin and the panel core are engaged together, the peripheral walls and said rear surface of said skin subtending a regular angle when the side face portions of the skin are fitted into engagement with the peripheral walls of said panel core, and the regular angle being less than the bend angle;

providing a mold having a first die with a first die molding recess for accepting the panel core and a second die with a second die molding recess for accepting the skin;

providing the second die with a skin holding member with a face holding member for engaging an outer face of the side face portions when the skin is situated in the second die molding recess, the skin holding member being movably disposed in the second die to permit insertion of the face holding member into the second die molding recess to engage the side face portions and to permit withdrawal of the face holding member from the second die molding recess;

situating the panel core in the first die molding recess;

situating the skin in the second die molding recess such that the side face portions are deflected by the face holding member to reduce the bend angle so the side face portions are fittable into the recess of the panel core during mold closing;

closing the mold to fit the side face portions into the recess of the panel core;

pulling the skin holding member to withdraw the face holding member from the recess of the second die to permit engagement of the side face portions with the peripheral walls and define the molding space between the panel core and the skin; and injecting a foaming material into the molding space between the panel core and the skin to thereby integrate the panel core and the skin with a foaming layer formed by the foaming material.

8. The method of fabricating an instrument panel according to claim 7, wherein the bend angle of each of the side face portions of the skin is set to be larger than the regular angle by an amount in a range of 2° through 8°.

9. The method of fabricating an instrument panel according to claim 7, wherein the bend angle of each of the side face portions of the skin is set to be larger than the regular angle by an amount in a range of 3° through 5°.

10. The method of fabricating an instrument panel according to claim 7, wherein at least one of the side face portions of the skin is formed in a stepped shape having a base end portion in contact with the peripheral walls of the recess and a front end portion displaced inwardly into the recess when the side face portion is fitted to the recess of the panel core by closing the mold.

11. The method of fabricating an instrument panel according to claim 7, wherein the side face portions of the skin and the peripheral walls of the recess of the panel core are each formed with fitting portions for engaging one another to position the side face portions and the peripheral walls relative to each other by the step of closing the mold.

\* \* \* \* \*